United States Patent
Dylhoff et al.

(10) Patent No.: US 9,518,499 B2
(45) Date of Patent: Dec. 13, 2016

(54) DEF INJECTOR COOLING SYSTEM AND METHOD

(71) Applicant: Deere & Company, Moline, IL (US)

(72) Inventors: Jonathan A. Dylhoff, Dubuque, IA (US); Brent M. Hunold, Dubuque, IA (US); Paul A. Wantschik, Platteville, WI (US); Mark D. Anderson, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 14/601,831

(22) Filed: Jan. 21, 2015

(65) Prior Publication Data

US 2016/0208670 A1 Jul. 21, 2016

(51) Int. Cl.
*F01N 3/20* (2006.01)
*F01N 3/04* (2006.01)
*F01P 5/10* (2006.01)
*F01N 11/00* (2006.01)
*F01P 3/20* (2006.01)

(52) U.S. Cl.
CPC ............ *F01N 11/002* (2013.01); *F01N 3/04* (2013.01); *F01N 3/206* (2013.01); *F01N 3/2066* (2013.01); *F01P 3/20* (2013.01); *F01P 5/10* (2013.01); *F01N 2260/024* (2013.01); *F01N 2610/02* (2013.01); *F01N 2610/11* (2013.01); *F01P 2005/105* (2013.01)

(58) Field of Classification Search
CPC .. F01N 3/206; F01N 2610/02; F01N 2610/11; F01P 5/10; F01P 2005/105
See application file for complete search history.

(56) References Cited

U.S. PATENT DOCUMENTS

| | | | |
|---|---|---|---|
| 2011/0098883 A1* | 4/2011 | Eser | F01P 5/14 701/33.4 |
| 2012/0036838 A1 | 2/2012 | Furuya | |
| 2013/0291523 A1 | 11/2013 | Shah et al. | |
| 2014/0174696 A1* | 6/2014 | Fahrenkrug | F28D 15/00 165/104.11 |
| 2014/0260199 A1 | 9/2014 | Grzesiak et al. | |
| 2015/0198074 A1* | 7/2015 | Mori | F01N 3/2066 60/286 |
| 2016/0047374 A1* | 2/2016 | Gonze | F04B 51/00 73/168 |

FOREIGN PATENT DOCUMENTS

| | | | | |
|---|---|---|---|---|
| FI | WO 2014102122 A1 * | 7/2014 | | F01P 7/165 |
| JP | 09096212 A * | 4/1997 | | |
| JP | WO 2014192320 A1 * | 12/2014 | | F01N 3/2066 |

* cited by examiner

*Primary Examiner* — Audrey K Bradley

(57) ABSTRACT

A DEF injector cooling system may include a mechanical pump, an electric pump, and a controller. The mechanical pump may be rotatably coupled to an engine so as to be driven by the engine. The mechanical pump may be fluidly connected to the engine, a DEF injector, and a heat exchanger, and configured to pump coolant through these components. The electric pump may be fluidly connected to the DEF injector and configured to pump coolant through it. The controller may be configured to receive an ambient temperature signal indicative of an ambient temperature and power the electric pump after a shutdown of the engine for a period of time, the duration of the period of time based on the ambient temperature signal.

20 Claims, 6 Drawing Sheets

DEF INJECTOR COOLING SYSTEM AND METHOD

FIELD OF THE DISCLOSURE

The present disclosure relates to a machine and a method of using a machine. An embodiment of the present disclosure relates to a system for cooling a dosing module of an engine exhaust aftertreatment system. Another embodiment of the present disclosure relates to a method for cooling a dosing module of an engine exhaust aftertreatment system.

BACKGROUND

Diesel engine systems may utilize selective catalytic reduction (SCR) for exhaust aftertreatment. In SCR systems, a liquid commonly referred to as diesel exhaust fluid (DEF) may be injected into the exhaust gas so as to react with certain components of the exhaust gas. A DEF injector may be used for to inject DEF into the exhaust gas.

The temperature of the exhaust gas and the temperature in the area in which the DEF injector is located may be relatively high for certain diesel engine systems or for certain applications of these systems. High temperatures may damage, destroy, or cause suboptimal performance of the DEF injector.

SUMMARY

According to an aspect of the present disclosure, a DEF injector cooling system may include a mechanical pump, an electric pump, and a controller. The mechanical pump may be rotatably coupled to an engine so as to be driven by the engine. The mechanical pump may be fluidly connected to the engine, a DEF injector, and a heat exchanger, and configured to pump coolant through these components. The electric pump may be fluidly connected to the DEF injector and configured to pump coolant through it. The controller may be configured to receive an ambient temperature signal indicative of an ambient temperature and power the electric pump after a shutdown of the engine for a period of time based on the ambient temperature signal.

According to another aspect of the present disclosure, the electrical pump may be fluidly connected in series with the mechanical pump and the DEF injector between the mechanical pump and the DEF injector, and downstream of the mechanical pump.

According to another aspect of the present disclosure, the DEF injector may be fluidly connected in series with the electric pump and the mechanical pump, between the electric pump and the mechanical pump, and downstream of the electric pump.

According to another aspect of the present disclosure, the mechanical pump, electric pump, and DEF injector may be are fluidly connected in series in a loop such that the mechanical pump is fluidly connected to the electric pump upstream of the electric pump, the electric pump is fluidly connected to the DEF injector upstream of the DEF injector, and the DEF injector is fluidly connected to the mechanical pump upstream of the mechanical pump.

According to another aspect of the present disclosure, the loop may be a first loop, the mechanical pump may be fluidly connected to the heat exchanger in a second loop configured to allow coolant to flow from the mechanical pump to the heat exchanger and from the heat exchanger to the mechanical pump, and the second loop may be separate from the first loop.

According to another aspect of the present disclosure, the controller may be further configured to power the electric pump for less than 50% of the time the engine is running.

According to another aspect of the present disclosure, the controller may be further configured to power the electric pump less than 5% of the time the engine is running.

According to another aspect of the present disclosure, the controller may be further configured to power the electric pump during engine operation and determine whether the electric pump is operational.

According to another aspect of the present disclosure, the controller may be further configured to derate the engine if the electric pump is not operational.

According to another aspect of the present disclosure, the controller may be further configured to prevent regeneration of the engine if the electric pump is not operational.

According to another aspect of the present disclosure, a method of cooling a DEF injector may include providing coolant flow from a mechanical pump to a DEF injector during operation of an engine, the mechanical pump rotationally coupled to the engine, detecting a shutdown of the engine, sensing an ambient temperature, determining a pump run time based on the sensed ambient temperature, and powering an electric pump to pump coolant through the DEF injector for the determined pump run time after the detected shutdown of the engine.

According to another aspect of the present disclosure, the coolant flow from the mechanical pump may pass through the electric pump before reaching the DEF injector.

According to another aspect of the present disclosure, the method may include powering the electric pump for less than half the time the engine is operating.

According to another aspect of the present disclosure, the method may include powering the electric pump to pump coolant through the DEF injector while the engine is operating and determining whether the electric pump is operational.

According to another aspect of the present disclosure, the method may include derating the engine during operation if the electric pump is not operational.

According to another aspect of the present disclosure, the method may include preventing regeneration of the engine during operation if the electric pump is not operational.

According to another aspect of the present disclosure, the method may include providing an alert if the electric pump is not operational.

According to another aspect of the present disclosure, the method may include sensing a temperature of exhaust from the engine and determining the pump run time based on the sensed ambient temperature and the sensed exhaust temperature.

According to another aspect of the present disclosure, the pump run time may be positively correlated with the sensed ambient temperature and positively correlated with the sensed exhaust temperature.

According to another aspect of the present disclosure, the method may include determining the pump run time to prevent a temperature of the DEF injector from rising above a threshold.

The above and other features will become apparent from the following description and accompanying drawings.

BRIEF DESCRIPTION OF THE DRAWINGS

The detailed description of the drawings refers to the accompanying figures in which.

Like reference numerals are used to indicate like elements throughout the several figures.

DETAILED DESCRIPTION

Figure 1:
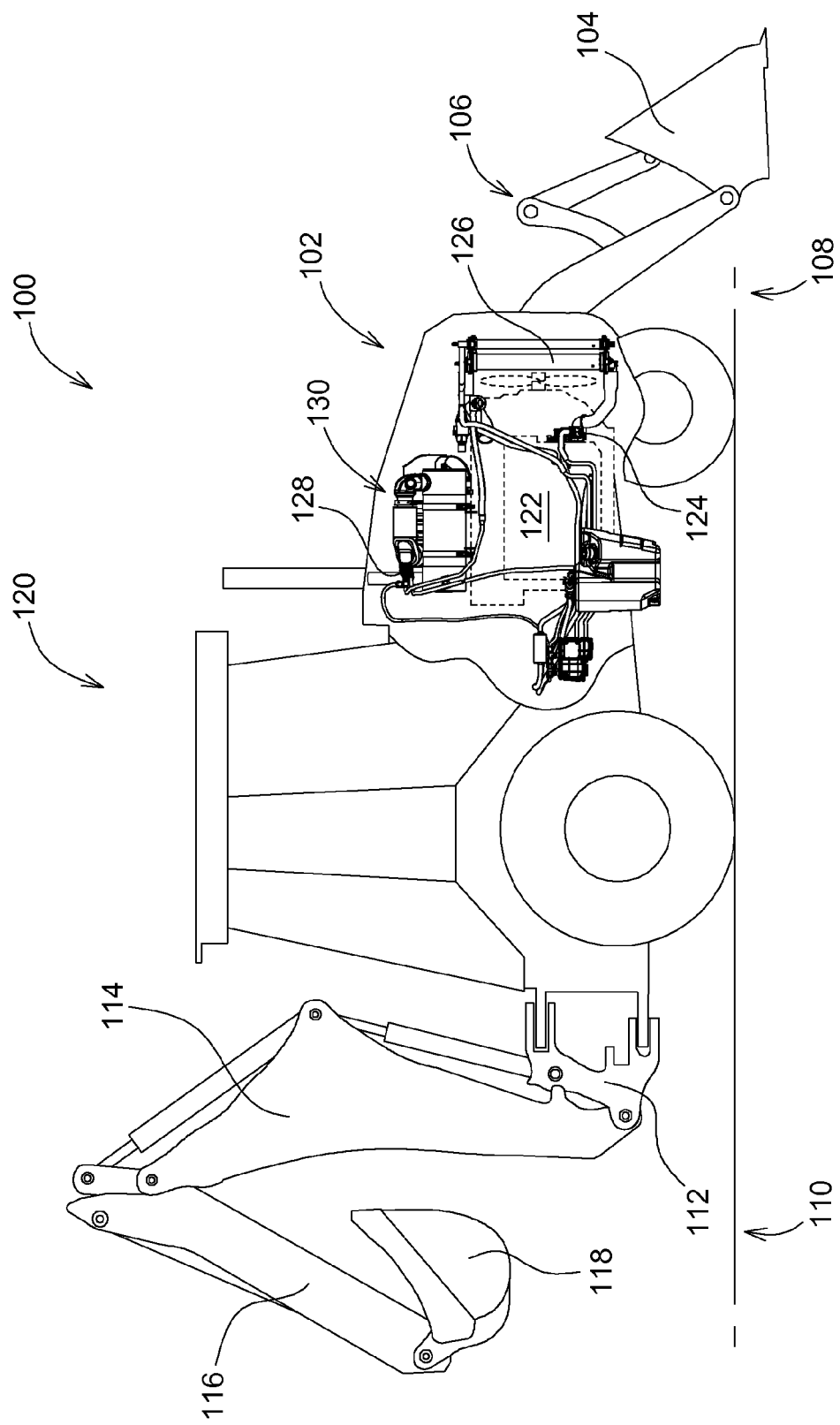
FIG. 1 is a side view of a backhoe loader with a DEF injector.

FIG. 1 illustrates work vehicle 100, which is a backhoe loader but may be any work vehicle with an exhaust aftertreatment system which includes a DEF injector, such as an articulated dump truck, compact track loader, crawler (e.g., crawler dozer, crawler loader), excavator, feller buncher, forwarder, harvester, knuckleboom loader, motor grader, scraper, skidder, sprayer, skid steer, tractor, tractor loader, and wheel loader, to name a few work vehicles. Work vehicle 100 is comprised of chassis 102, which provides structure, strength, rigidity, and attachment points for work vehicle 100.

Connected to the front of work vehicle 100 is work tool 104. Work tool 104 is illustrated as a bucket, but may be any number of work tools such as forks, a blade, an auger, or a hammer, to name a few work tools. Work tool 104 is movably connected to chassis 102 via linkage 106, which is comprised of multiple rigid members pivotally connected to each other, chassis 102, and work tool 104. Linkage 106 allows work tool 104 to be raised and lowered relative to chassis 102 as well as tilted forward or backward. For example, linkage 106 may be actuated to tilt work tool 104 backward to gather material or forward to dump such material. Linkage 106, and work tool 104, may be raised or lowered relative to chassis 102 by lift cylinders and work tool 104 may be tilted relative to chassis 102 by a tilt cylinder. Work tool 104, linkage 106, the lift cylinders, and tilt cylinder may collectively be referred to as loader assembly 108.

Connected to the rear of work vehicle 100 is backhoe assembly 110, comprising swing frame 112, boom 114, dipperstick 116, and work tool 118. Swing frame 112 pivotally attaches backhoe assembly 110 to chassis 102 so as to allow backhoe assembly 110 to pivot left and right relative to an operator sitting in the operator station 120 of work vehicle 100. Boom 114 is pivotally connected to swing frame 112 at a first end and extends vertically and rearwardly from swing frame 112 to pivotally connect to dipperstick 116 at a second end. This allows boom 114 to pivot about a substantially horizontal axis relative to work vehicle 100, allowing boom 114 to be raised toward a vertical position and lowered toward a horizontal position. Dipperstick 116 is similarly pivotally connected to boom 114 about a substantially horizontal axis relative to work vehicle 100 at a first end and extends towards a pivotal connection with work tool 118 at a second end. The range of motion for dipperstick 116 allows it to be pivoted so as to form a narrow V-shape with boom 114 which positions the second end of dipperstick 116 (and work tool 118) close to swing frame 112, or to be pivoted so as to form nearly a straight line with boom 114 which positions the second end of diperstick 120 (and work tool 118) far from both swing frame 112 and boom 114.

Work tool 118 is illustrated as a bucket, but may be any number of different kinds of work tools. In FIG. 1, work tool 118 is pivotally connected directly to dipperstick 116, but in alternative embodiments work tool 118 may pivotally connect to dipperstick 116 via a coupler or other intermediate component. Hydraulic cylinders may be used to actuate boom 114, dipperstick 116, and work tool 118.

Work vehicle 100 may be powered by engine 122, which may be a turbocharged diesel engine. Engine 122 may power work vehicle 100 through components rotatably coupled to engine 122, such as transmissions, hydraulic pumps, water pumps, and alternators. These components may be rotatably coupled to engine 122 via splines or other gearing which allows torque to be transmitted and thereby drive the components. Mechanical pump 124 is one such component rotatably coupled to engine 122 so as to be driven by engine 122. Mechanical pump 124, which may also be referred to as a water pump or a coolant pump, draws coolant in through one or more inlets and provides coolant flow to one or more outlets which may be fluidly connected to various components on work vehicle 100, such as heat exchanger 126, DEF injector 128, and engine 122. The distribution of coolant flow from mechanical pump 124 to these various components may be controlled, such as by a valve, to achieve various temperature or cooling goals.

Engine 122 may include exhaust aftertreatment system 130, which may treat and filter the exhaust gases of engine 122. Exhaust aftertreatment system 130 includes DEF injector 128, which receives DEF from a DEF supply module or pump which is connected to a DEF tank. DEF injector 128, which may also be referred to as a DEF dosing module, injects the received DEF into the exhaust stream where it can mix with the exhaust gases and react with certain components. DEF injector 128 includes nozzles or apertures designed to produce particular spray shapes, distributions, or droplet sizes of the DEF being injected into the exhaust stream. Portions of exhaust aftertreatment system 130, including DEF injector 128, may experience high temperatures due to their contact and proximity to exhaust gases from engine 122.

Figure 2:
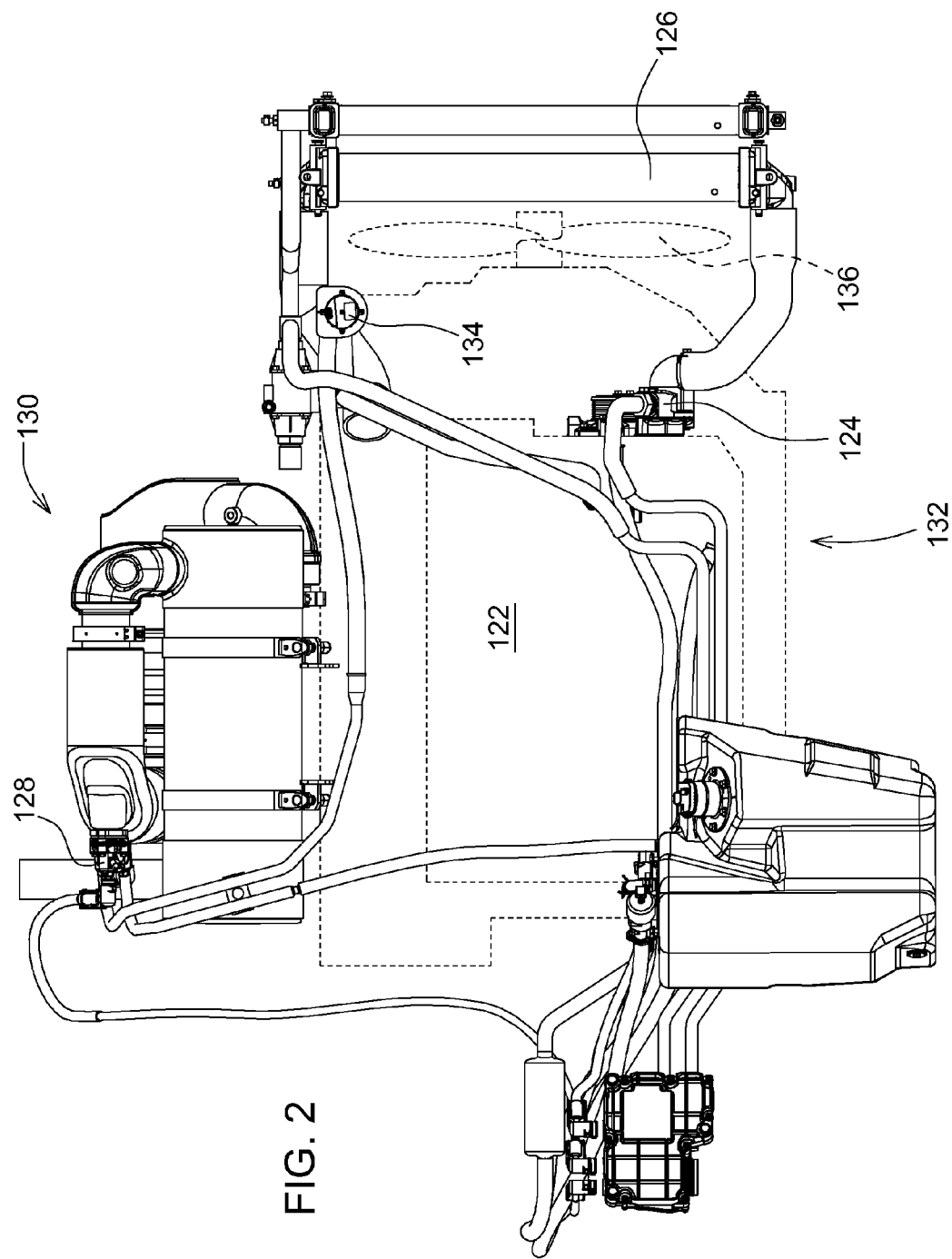
FIG. 2 is a side view of a cooling system for the DEF injector.

FIG. 2 illustrates DEF injector cooling system 132, which actively cools DEF injector 128 by circulating coolant through DEF injector 128. When engine 122 is operating, mechanical pump 124 is being driven and therefore is pumping coolant to various components of work vehicle 100, including heat exchanger 126 and DEF injector 128.

Heat exchanger 126 is fluidly connected to mechanical pump 124 so that coolant may flow from mechanical pump 124 through heat exchanger 126 and back to mechanical pump 124. This configuration forms a loop which includes mechanical pump 124, heat exchanger 126, and the coolant lines fluidly connecting the two components. This loop may reduce the temperature of the coolant flowing through mechanical pump 124 as heat exchanger 126 rejects heat from the coolant into the surrounding air. In this embodiment, a fan is used to pass air over heat exchanger 126 to aid in heat transfer from the coolant to the surrounding air. In alternative embodiments, heat exchanger 126 may not utilize a fan or may transfer heat into a different medium such as another liquid rather than air.

DEF injector 128 is located in a separate cooling loop from heat exchanger 126. DEF injector 128 is fluidly connected to mechanical pump 124 so that coolant may flow from mechanical pump 124 through DEF injector 128 and back to mechanical pump 124. Electric pump 134 is fluidly connected in series with, and fluidly connected between, mechanical pump 124 and DEF injector 128 such that all coolant flow from mechanical pump 124 passes through electric pump 134 before reaching DEF injector 128. This configuration forms a loop which includes mechanical pump 124, electric pump 134, and DEF injector 128. This loop may reduce the temperature of DEF injector 128 when the coolant is at a lower temperature than DEF injector 128. Thus, mechanical pump 124, electric pump 134, and DEF injector 128 are fluidly connected in series, with mechanical pump 124 fluidly connected with electric pump 134 upstream of electric pump 134, electric pump 134 fluidly connected with DEF injector 128 upstream of DEF injector 128, and DEF injector 128 fluidly connected with mechanical pump 124 upstream of mechanical pump 124. This coolant flow loop may help keep DEF injector 128 below a threshold temperature or below a temperature range which may damage, destroy, or cause suboptimal performance of DEF injector 128.

Figure 3:
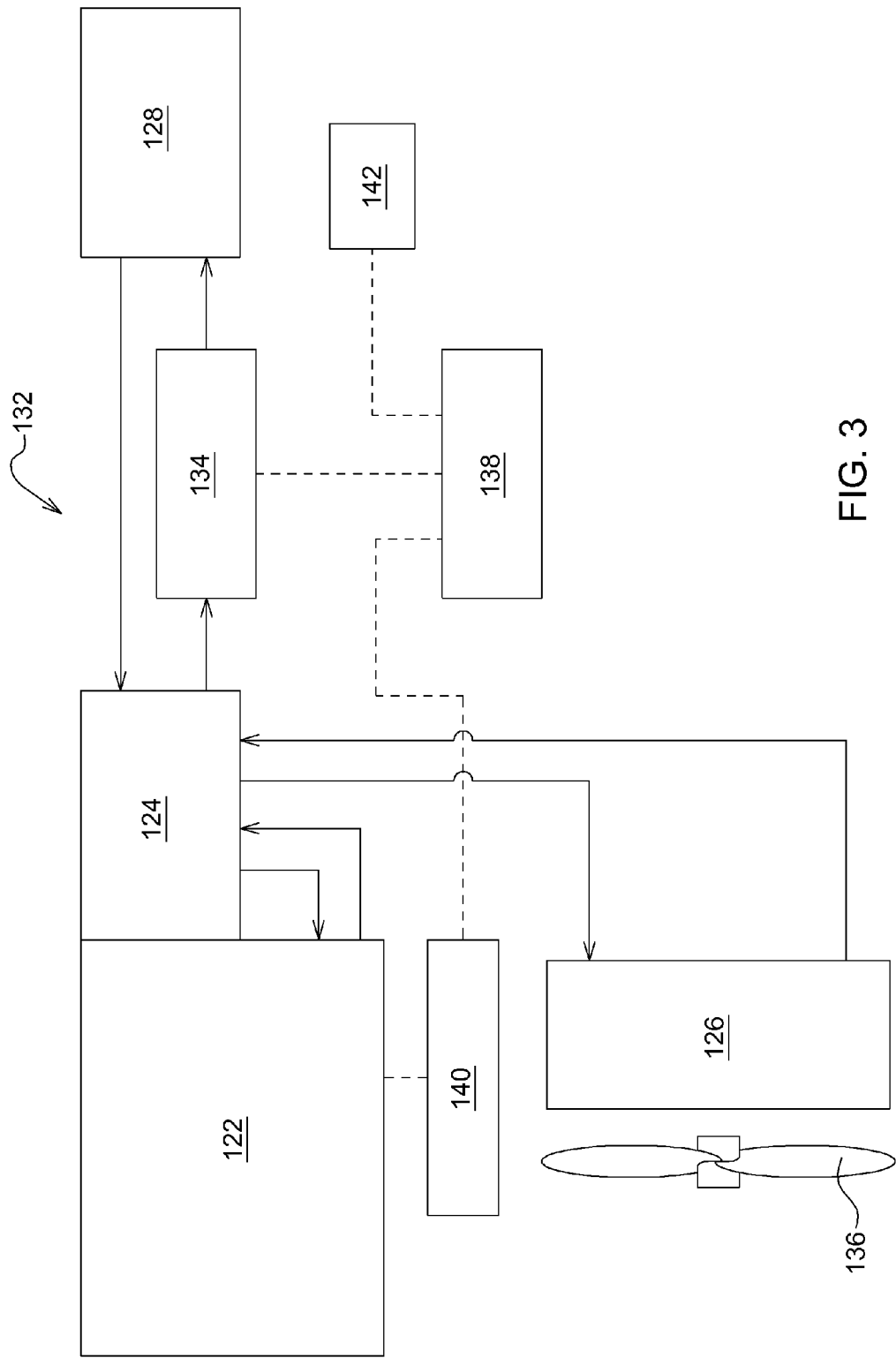
FIG. 3 is a schematic of the DEF injector cooling system.

FIG. 3 is a schematic of DEF injector cooling system 132. As shown in FIG. 3, mechanical pump 124 is rotatably coupled to engine 122 so as to be driven by engine 122. Mechanical pump 124 provides coolant flow to engine 122, heat exchanger 126, and DEF injector 128. Coolant may flow from mechanical pump 124 to engine 122, through internal passages in engine 122 where heat may transfer from engine 122 to the coolant, and then back to mechanical pump 124. Coolant may also flow from mechanical pump 124 to heat exchanger 126, through the fluid passages of heat exchanger 126 where heat may be transferred from the coolant to heat exchanger 126 and then to the surrounding air, and back to mechanical pump 124. Fan 136, which may be a mechanically, hydraulically, or electrically powered fan, may be operated to provide airflow through the air passages of heat exchanger 126 to increase the heat transfer from the coolant to the surrounding air, and may also be used to manage airflow such as drawing in cool air from one location and expelling heated air to another location. Coolant may also flow from mechanical pump 124 through electric pump 134 to DEF injector 128, through fluid passages of DEF injector 128 where heat may be transferred from DEF injector 128 to the coolant, and back to mechanical pump 124.

Mechanical pump 124 provides these flows in three separate loops in the embodiment shown in FIG. 3. Heated coolant returning from engine 122 and DEF injector 128 is mixed with cooled coolant returning from heat exchanger 126 and then pumped back out to all three components. This enables heat from engine 122 and DEF injector 128 to be rejected to the surrounding air by heat exchanger 126 even though the components are in different cooling loops. In alternative embodiments, these cooling loops may be configured differently. In alternative embodiments, heat exchanger 126 may be fluidly connected in series between engine 122 and mechanical pump 124 so that heated coolant from engine 122 may flow through heat exchanger 126 before returning to mechanical pump 124. In other alternative embodiments, an additional heat exchanger may be fluidly connected in series between DEF injector 128 and mechanical pump 124 so that heated coolant from DEF injector 124 may flow through the additional heat exchanger before returning to mechanical pump 124. In yet other alternative embodiments, coolant flow to and/or from mechanical pump 124 may be distributed by a valve or series of valves to various components so as to allow control over the flow rate to each component or control the mixing of coolant from different cooling loops.

Electric pump 134 is electrically powered and may pump coolant in the direction of DEF injector 128 when powered. Electric pump 134 is configured so as to allow coolant flow from mechanical pump 124 to pass through electric pump 134 and on to DEF injector 128 regardless of whether electric pump 134 is powered. If electric pump 134 is unpowered, or disengaged, coolant may flow through it with only flow resistance losses. For some applications, this configuration may provide benefits over a system in which a secondary coolant pump is fluidly connected to DEF injector 128 in parallel with a primary coolant pump. Such benefits may include reduced complexity in the plumbing necessary to fluidly connect both coolant pumps to the DEF injector, a reduced number of fluid connections capable of leaking coolant, reduced complexity in the necessary hydraulic logic, and fewer packaging constraints.

If electric pump 134 is powered, or engaged, it pumps coolant which may cause some combination of increased coolant flow rates or decreased coolant pressure at the outlet of mechanical pump 124. Electric pump 134 may be powered by controller 138, to which it is electrically connected, through electric power transmitted from controller 138 to electric pump 134 via a wire harness connecting the two components. In alternative embodiments, electric pump 134 may be powered by controller 138 indirectly, such as by controller 138 sending a command signal to another component (e.g., relay, power electronics, second controller) to direct electric power to electric pump 134. Either way, controller 138 may send a command signal to engage electric pump 134, where the command signal may be electric power transmitted directly from controller 138 to electric pump 134 or a communication to another component to transmit power to electric pump 134.

Controller 138, which may also be referred to as a vehicle control unit (VCU), is in communication with engine 122 via ECU 140 such that it may receive signals indicative of the state or performance of engine 122. ECU 140, which may also be referred to as an engine control unit, is a second controller which controls and monitors engine 122 via its communication with multiple components connected to engine 122, such as sensors and solenoids. ECU 140 may receive signals indicative of characteristics of engine 122, such as its rotational speed, power generation, fuel consumption, temperature, or pressures. ECU 140 may send signals to controller 138, such as via a controller area network (CAN), communicating certain of these characteristics. Controller 138 may thereby receive a signal indicative of a shutdown of engine 122, such as a message communicating that the status of engine 122 is shutting down, shut down, or will shut down at a certain time, or a message which may indirectly indicate a shutdown, such as one indicating the rotational speed of the engine. ECU 140 may send signals indicative of a temperature of engine 122, which may be based a signal from a temperature sensor measuring the temperature at any of a number of points on engine 122 (e.g., oil, coolant, block), and a temperature at some point in exhaust aftertreatment system 130. These engine temperature and exhaust temperature signals may be utilized in controlling electric pump 134 as they may provide indirect indications of the temperature of DEF injector 128 when no direct measurement is available.

Controller 138 is also in communication with temperature sensor 142. Temperature sensor 142 may be positioned and configured so as to measure the ambient temperature surrounding DEF injector cooling system 132, which may also be referred to as the environmental temperature, atmospheric temperature, or external temperature. Temperature sensor 142 may be positioned remotely from DEF injector cooling system 132 so as to avoid heat from DEF injector cooling system 132 interfering with the temperature sensed by temperature sensor 142. If DEF injector cooling system 132 is mounted in a vehicle, as illustrated in FIG. 1, temperature sensor 142 may be positioned on an external surface of the vehicle so as to increase the likelihood of sensing the ambient temperature without interference from a heat source on the vehicle. Temperature sensor 142 communicates the ambient temperature to controller 138 via a CAN message carried on a wiring harness electrically interconnecting temperature sensor 142 and controller 138. Controller 138 receives this ambient temperature signal and determines the corresponding ambient temperature it indicates by using a lookup table which maps the voltages received from temperature sensor 142 to associated temperatures. In alternative embodiments, the ambient temperature signal may be a voltage signal where the magnitude of the voltage corresponds to the sensed ambient temperature.

Electric pump 134 may be utilized to cool DEF injector 128 after mechanical pump 124 ceases to provide coolant flow, such as when engine 122 ceases to rotate. One application for this configuration is a "hot shutdown," where engine 122 is shut down while it or exhaust aftertreatment system 130 is still relatively hot, although DEF injector cooling system 132 may be beneficial in other applications besides hot shutdowns. In such situations, the temperature of DEF injector 128 may actually rise after engine 122 shuts down as DEF injector 128 continues to absorb heat from exhaust gases or surrounding components but no longer is able to transfer such heat to a flow of coolant as mechanical pump 124 has ceased operation. Further, the temperature of DEF injector 128 may not be uniform or may not rise evenly, and localized hot spots may form on portions of DEF injector 128. The general increased temperature of DEF injector 128 or the localized hot spots may damage, destroy, or cause suboptimal performance of DEF injector 128. Electric pump 134 circulates coolant through DEF injector 128, which may cool DEF injector 128 sufficiently to keep prevent DEF injector 128 from suffering damage. Electric pump 134 may be sized and operated so as to prevent DEF injector 128 from rising above a temperature threshold at which damage may occur.

Figure 4:
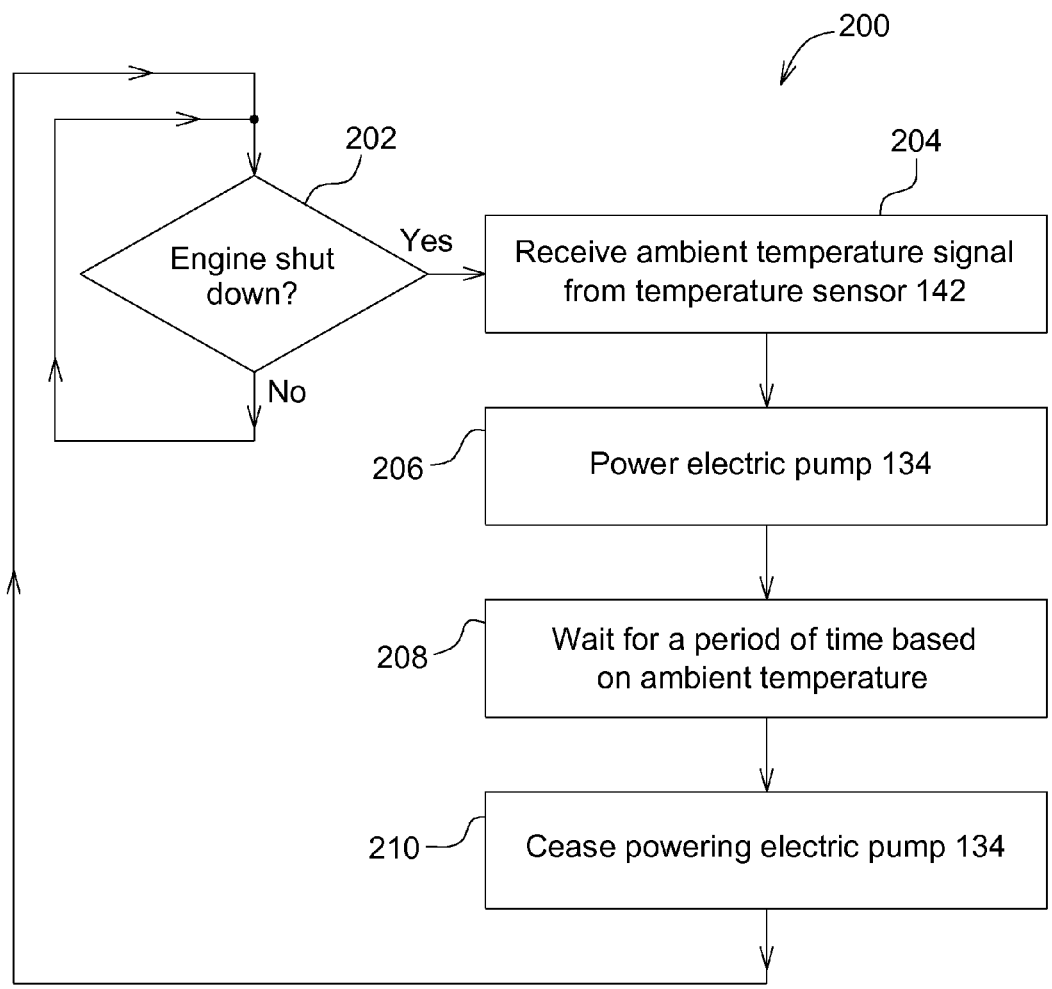
FIG. 4 is a flowchart of a method of cooling a DEF injector.

FIG. 4 is a flowchart of control system 200 for cooling DEF injector 128 using DEF injector cooling system 132. Controller 138 may be configured to execute control system 200.

In step 202, controller 138 determines whether engine 122 has just shut down or is in the process of shutting down. If engine 122 is not shutting, or has not just shut down, step 202 is performed, forming a loop within control system 200 where no other steps are performed until engine 122 shuts down or is shutting down. If engine 122 has just shut down or is in the process of shutting down, step 204 is performed next. In step 202, controller 138 determines whether engine 122 is shutting down by detecting the first time that ECU 140 sends a message on a CAN bus interconnecting controller 138 and ECU 140 indicating that engine 122 is in a shutdown state.

In step 204, controller 138 receives the ambient temperature signal from temperature sensor 142. Controller 138 may then convert this received signal into an ambient temperature by using a lookup tab which maps values for ambient temperature signal to ambient temperatures. In alternative embodiments, such conversion may take place through the use of a formula or multiple equations. In other alternative embodiments, such conversion is not necessary if control system 200 has been designed to utilize the raw value of the ambient temperature signal in later calculations and determinations.

In step 206, controller 138 powers electric pump 134 by sending electrical current to electric pump 134 via a wire harness electrically interconnecting controller 138 and electric pump 134. In alternative embodiments, controller 138 may power electric pump 134 by sending a command signal to another component, such as another controller, a relay, power electronics, or a power module, to power electric pump 134. The electrical power may be provided by a battery or other power source on work vehicle 100. Controller 138 may be electrically connected to this battery such that it may continue to receive power even when engine 122 is not operating, or even when a key or other switch is turned to an off position for work vehicle 100. This allows controller 138 to continue to operate, and continue to power electric pump 134, after shutdown of engine 122. Controller 138 may be electrically connected to this battery such that it may only draw power from the battery for a period of time after shutdown of engine 122 or work vehicle 100, which may prevent controller 138 from drawing too much power from battery.

Electric pump 134, driven by this power, then pumps coolant through DEF injector 128. Electric pump 134 may be activated immediately after a shutdown of engine 122 begins, in which case coolant flow from mechanical pump 124 may be decreasing as the rotational speed of engine 122 decreases, while the pumping capabilities of electric pump 134 may be increasing as it receives power. The net result of this may be that the rate of coolant flow through DEF injector 128 may remain unchanged or only gradually change. Alternatively, electric pump 134 may also be activated later in the shutdown of engine 122, such as when the rotational speed of engine 122 falls below a threshold value such as 100 rotations per minute. That situation may result in a rapid decrease in the coolant flow rate through DEF injector 128 followed by an increase in the coolant flow rate when electric pump 134 is powered.

In step 208, controller 138 waits for a period of time during which electric pump 134 is powered, which may be referred to as the run time or the run time for electric pump 134. Controller 138 determines the duration of this period of time based on the ambient temperature signal received in step 204. As the ambient temperature rises, heat from engine 122 and exhaust aftertreatment system 130 is slower to dissipate and therefore may cause DEF injector 128 to reach a higher temperature and/or remain at an elevated temperature for a longer period of time. Further, DEF injector 128 itself may be able to dissipate less heat as ambient temperature rises. To aid in the rejection of this heat, controller 138 may power electric pump 134 for a longer period of time if the ambient temperature is high and for a shorter period of time if the ambient temperature is low. This dynamically determined run time may allow control system 200 to prevent DEF injector 128 from reaching damaging temperatures without overtaxing the battery, or other power source, providing electrical power to controller 138 and electrical pump 134. It may also limit the total run time of electric pump 134, allowing for a more cost effective component to be used or extending the life of electric pump 134. The usage of both mechanical pump 124 and electric pump 134 also permits electric pump 134 to be run for very little of the time engine 122 is operating. For example, electric pump 134 may run only when the engine is shutting down or off, and may occasionally also run at engine start up to confirm that it is operating properly (see FIG. 6 regarding such operation), which may amount to far less than 5% of the running time of engine 122.

Controller 138 may determine the run time of electric pump 134 in a number of different manners. As one example, controller 138 may apply a gain to the ambient temperature to determine the run time. As another example, controller 138 may apply a gain to the difference between the ambient temperature and a baseline temperature, such as 250 K and sum that with a constant (e.g., 15 seconds) to ensure operation of electric pump 134 for a minimum period of time. As another example, controller 138 may determine the run time by utilizing a lookup table or an equivalent which associates various run times with various ambient temperatures. In the above examples, ambient temperature and the run time of electric pump 134 are positively correlated such that higher values for ambient temperature are associated with higher run times for electric pump 134. Appropriate values for these gains and lookup tables may be determined, for example, based on modeling of the heat flow for DEF injector 138 or on empirical testing.

As used herein, "based on" means "based at least in part on" and does not mean "based solely on," such that it neither excludes nor requires additional factors. In step 208, controller 138 could use only the ambient temperature to determine the run time of electric pump 134, or it could use a number of different factors in addition to ambient temperature to determine the run time of electric pump 134, for example as described below with reference to FIG. 5.

Control system 200 does not require that controller 138 receive a temperature signal indicative of a temperature of DEF injector 128. If such a temperature signal is lacking, control system 200 may still operate as a feed-forward or open-loop system which utilizes ambient temperature to determine the run time of electric pump 134. For certain applications, this type of system may have advantages over a feedback or closed-loop. For example, control system 200 does not require a temperature sensor to be positioned to sense the temperature of DEF injector 128. Such a temperature sensor and its associated wire harness or method of communicating with controller 138 may add cost, complexity, packaging, maintenance, and reliability considerations to the design of work vehicle 100.

After the period of time in step 208 has passed, controller 138 may next perform step 210 in which it ceases to power electric pump 134. After disengaging electric pump 134 in step 210, controller 138 may next proceed to step 202 to restart control system 200. Controller 138 may then loop through step 202 until engine 122 has undergone its next cycle of operation and shutdown, or work vehicle 100 may cease powering controller 138 at some point after step 210 such that the loop does not occur. A flag may be utilized to aid in determining whether a shutdown has occurred in order to prevent step 204, step 206, step 208, and step 210 from being repeated after engine 122 is shut down. For example, in step 202, controller 138 may utilize a flag which is set to 1 once engine 122 is operating and which is set to 0 upon shutdown of engine 122. Controller 138 may transition to step 202 only when it detects that the flag has changed from 1 to 0, but will not transition to step 202 when if it only detects that the flag has remained at 0.

Figure 5:
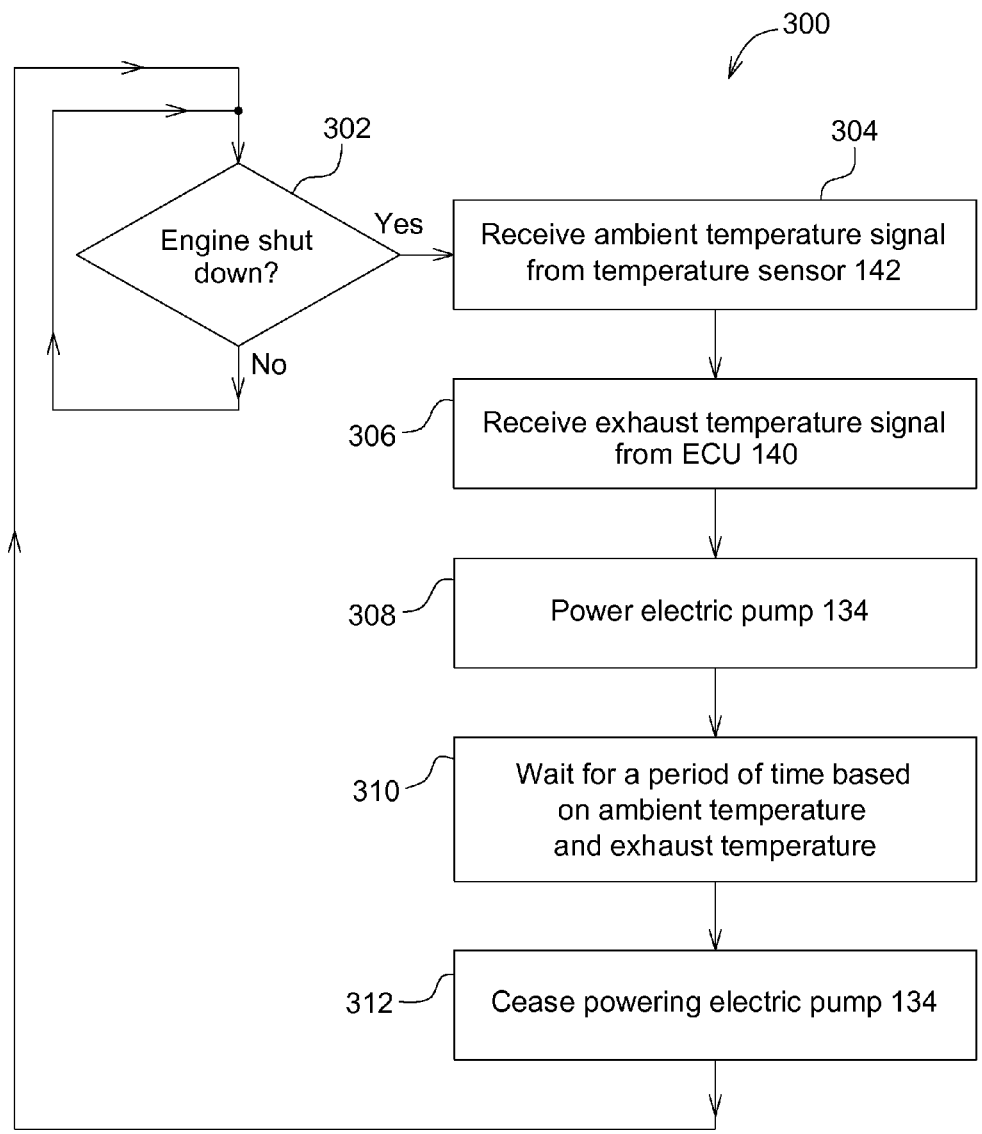
FIG. 5 is a flowchart of another method of cooling a DEF injector.

FIG. 5 is a flowchart of control system 300 for cooling DEF injector 128 using DEF injector cooling system 132. Controller 138 may be configured to execute control system 300.

In step 302, controller 138 determines whether engine 122 has just shut down or is in the process of shutting down. If engine 122 is not shutting down, or has not just shut down, step 302 is performed, forming a loop within control system 300 where no other steps are performed until engine 122 shuts down or is shutting down. If engine 122 has just shut down or is in the process of shutting down, step 304 is performed next. In step 302, controller 138 monitors the rotational speed of engine 122 and determines that a shutdown has occurred the first time the rotational speed drops below 100 rotations per minute.

In step 304, controller 138 receives the ambient temperature signal from temperature sensor 142. In step 306, controller 138 receives the exhaust temperature signal from ECU 140. ECU 140 measures and utilizes the exhaust temperature to control exhaust aftertreatment system 130. In particular, this exhaust temperature may be utilized to help control the process of regeneration, in which ECU 140 controls engine 122 and exhaust aftertreatment system 130 so as to increase the temperature of exhaust gases high enough to burn soot which may accumulate in exhaust aftertreatment system 130, particularly in a diesel particulate filter (DPF). ECU 140 may send this exhaust temperature signal to controller 138, such as via a message on a CAN bus interconnecting the two controllers. In alternative embodiments, controller 138 may receive the exhaust temperature signal directly from a temperature sensor.

In step 308, controller 138 powers electric pump 134 by sending a signal to a power module, which in turn acts as a relay and selectively electrically connects electric pump 134 to a battery on work vehicle 100. Electric pump 134, driven by this power, then pumps coolant through DEF injector 128.

In step 310, controller 138 waits for a period of time during which electric pump 134 is powered, which may be referred to as the run time or the run time for electric pump 134. Controller 138 determines the duration of this period of time based on the ambient temperature signal received in step 304 and the exhaust temperature signal received in step 306. As the ambient temperature rises, heat from engine 122, exhaust aftertreatment system 130, and DEF injector 128 is slower to dissipate and therefore may cause DEF injector 128 to reach a higher temperature and/or remain at an elevated temperature for a longer period of time. Further, as the exhaust temperature rises, heat may flow from the exhaust gases and surrounding structures into DEF injector 128 faster and the heat flow may continue at higher temperatures of DEF injector 128. To aid in the rejection of this heat, controller 138 may power electric pump 134 for a longer period of time if the ambient and exhaust temperatures are high and for a shorter period of time if these temperatures are low. This may allow control system 300 to prevent DEF injector 128 from reaching damaging temperatures without overtaxing the battery providing electrical power to controller 138 and electrical pump 134.

Controller 138 may determine the run time of electric pump 134 in a number of different manners in control system 300, as in control system 200. As one example, controller 138 may apply a gain to the ambient temperature and a gain to the exhaust temperature to determine the run time. As another example, controller 138 may apply a gain to the difference between the ambient temperature and a baseline ambient temperature and the difference between the exhaust temperature and a baseline exhaust temperature, such as 250 K and 350 K respectively, and sum that with a constant (e.g., 15 seconds) to ensure operation of electric pump 134 for a minimum period of time. As another example, controller 138 may determine the run time by utilizing a lookup table or an equivalent which associates various run times with various ambient and exhaust temperatures. In the above examples, both ambient temperature and exhaust temperature are positively correlated with run time such that higher values for the ambient and exhaust temperatures are associated with higher run times. Control system 300, like control system 200 described above, does not require that controller 138 receive a temperature signal indicative of a temperature of DEF injector 128, and control system 300 may operate as a feed-forward or open-loop system.

After the period of time in step 310 has passed, controller 138 may next perform step 312 in which it ceases to power electric pump 134. Controller 138 ceases to power electric pump 134 by ceasing to send a signal to a power module to relay power to electric pump 134. In alternative embodiments, controller 138 may not continuously send a signal to the power module to engage electric pump 134, but may instead send a first signal to power electric pump 134 and later send a second signal to cease powering electric pump 134. After disengaging electric pump 134 in step 312, controller 138 may next proceed to step 302 to restart control system 300.

Figure 6:
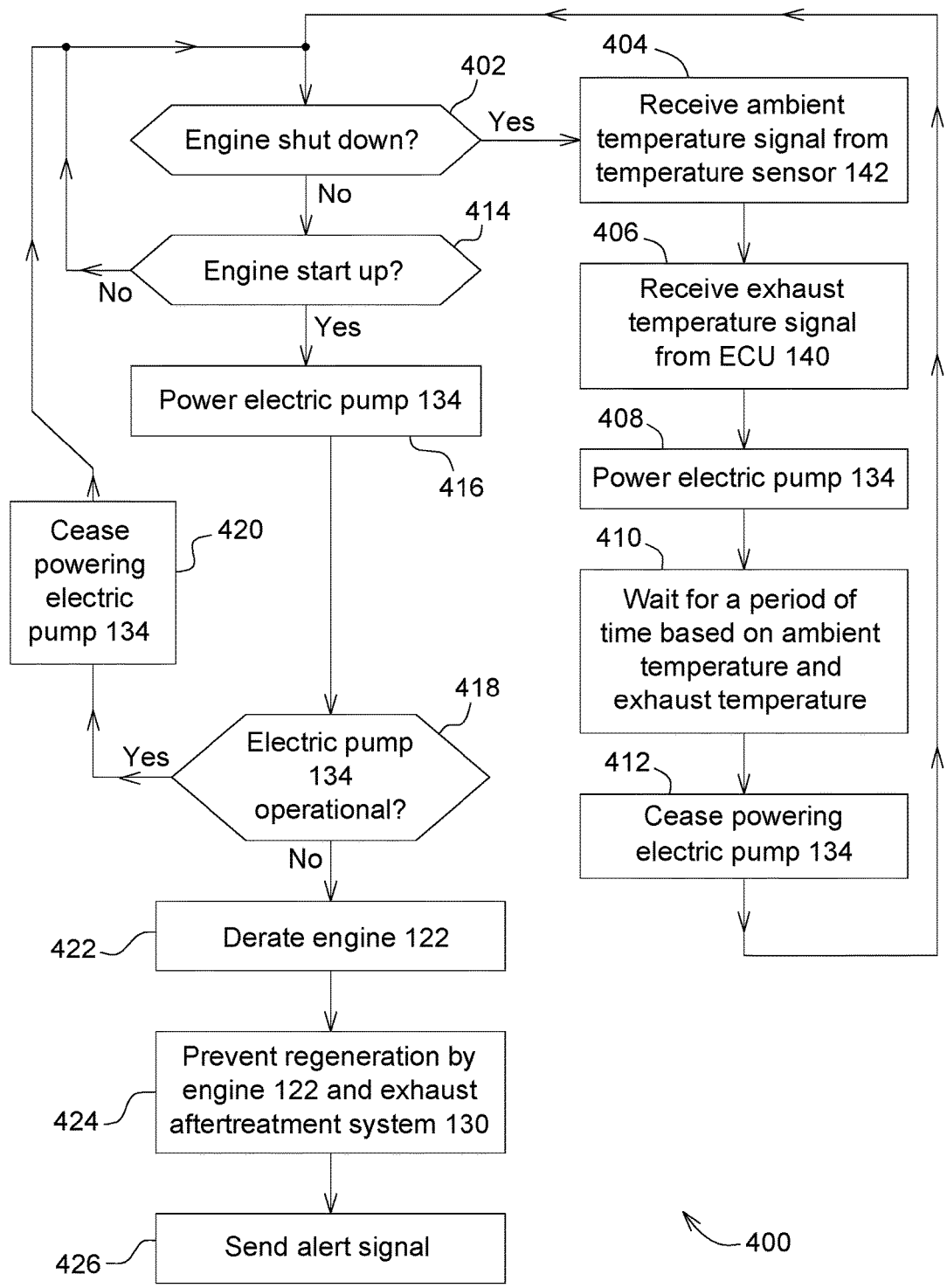
FIG. 6 is a flowchart of another method of cooling a DEF injector.

FIG. 6 is a flowchart of control system 400 for cooling DEF injector 128 using DEF injector cooling system 132. Controller 138 may be configured to execute control system 400. Control system 400 is similar to control system 300, but adds steps to verify the operation of electric pump 134.

In step 402, controller 138 determines whether engine 122 has just shut down or is in the process of shutting down. If engine 122 is shutting down, or has just shut down, step 404 is performed next. In step 402, controller 138 monitors the rotational speed of engine 122 and determines that a shutdown has occurred the first time the rotational speed drops below 100 rotations per minute.

In step 404, controller 138 receives the ambient temperature signal from temperature sensor 142. In step 406, controller 138 receives the exhaust temperature signal from ECU 140. In step 408, controller 138 powers electric pump 134 by relaying power from a battery on work vehicle 100 to electric pump 134. Electric pump 134, driven by this power, then pumps coolant through DEF injector 128.

In step 410, controller 138 waits for a period of time during which electric pump 134 is powered, which may be referred to as the run time or the run time for electric pump 134. Controller 138 determines the duration of this period of time based on the ambient temperature signal received in step 404 and the exhaust temperature signal received in step 406. In step 410, controller 138 may also check on the condition of the battery from which it is drawing power and determine the run time based on that condition. For example, controller 138 may monitor the condition of the battery to ensure that it does not draw the available energy in the battery down below a threshold. This threshold may be, for example, an amount of energy deemed sufficient to ensure that engine 122 may be started by the battery the next time work vehicle 100 is operated.

After the period of time in step 410 has passed, controller 138 may next perform step 412 in which it ceases to power electric pump 134. After step 412, controller 138 may return to step 402 and restart control system 400.

If controller 138 did not detect a shutdown of engine 122 in step 402, step 414 would be performed next. In step 414, controller 138 determines whether engine 122 has just completed start up, or is in the process of start up. To determine this, controller 138 may monitor a status message received from ECU 140 and see if the status message indicates that engine 122 has transitioned to start up or to operation. Alternatively, controller 138 may monitor the rotational speed of engine 122 and determine that a start up is occurring or has occurred, for example if the rotational speed of engine 122 passes 300 rotations per minute. If start up is not occurring or has not just occurred, step 402 would be performed next, forming a loop where step 402 and step 414 are repeated until engine 122 shuts down or starts up. If start up is occurring, or has just occurred, step 416 is performed next.

In step 416, controller 138 powers electric pump 134 by directing electrical power from a battery on work vehicle 100 to electric pump 134. In step 418, controller 138 determines whether electric pump 134 is operational and pumping coolant. Controller 138 does this by receiving a signal from electric pump 134 which is indicative of whether electric pump 134 is operative. Electric pump 134 has an integrated controller which monitors the performance of electric pump 134, and may send a signal (e.g., a voltage, a CAN message) back to controller 138 indicative of the state of electric pump 134 (e.g., idle, running, fault). In alternative embodiments, controller 138 may determine whether electric pump 134 is operational by sensing the voltage or current sent to electric pump 134 and comparing one or both of these against the expected values for an operational pump. For example, if electric pump 134 has a short circuit failure, controller 138 may be unable to raise the voltage to the normal operating level and if electric pump 134 has an open circuit failure, controller 138 may be unable to raise the current to the normal operating level. If electric pump 134 is operational, step 420 is performed next and controller 138 ceases powering electric pump 134. Then, step 402 is performed next and control system 400 is restarted. If electric pump 134 is not operational, step 422 is performed next.

In step 422, controller 138 derates engine 122 by limiting its maximum power output. Controller 138 may derate engine 122 by sending a message to ECU 140 indicating a limit on the maximum power output by engine 122, and ECU 140 may control engine 122 to keep it within that limit. In alternative embodiments, controller 138 may derate engine 122 by limiting its average or maximum power, average or maximum torque, average or maximum rotational speed, or some combinations of these factors, to name but a few ways to derate engine 122. Derating engine 122 may help limit or reduce the temperatures of engine 122, exhaust gases, and exhaust aftertreatment system 130 during operation of engine 122, which may help avoid DEF injector 128 reaching damaging temperatures if electric pump 134 is not operational after the shutdown of engine 122.

In step 424, controller 138 prevents regeneration by engine 122 and exhaust aftertreatment system 130. Controller 138 may prevent regeneration by sending a message to ECU 140 to indicate that regeneration should not be allowed. Avoiding the high temperatures caused by regeneration may help reduce the temperatures reached by DEF injector 128 after shutdown of engine 122 if electric pump 134 is not operational.

In step 426, controller 138 sends an alert signal indicating that electric pump 134 is not operational, that the engine has been derated, and that regeneration is suspended. This alert signal may be provided by controller 138 to an operator in operator station 120 of work vehicle 100, such as by displaying the alert on a monitor, using an alternative visual alert such as an icon or light, or giving an audible alert. Controller 138 may also provide this alert to a remote user, such as a site manager or equipment manager, such as through a message sent via a cellular or satellite communications network.

While the disclosure has been illustrated and described in detail in the drawings and foregoing description, such illustration and description is not restrictive in character, it being understood that illustrative embodiment(s) have been shown and described and that all changes and modifications that come within the spirit of the disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. A DEF injector cooling system comprising:
a mechanical pump rotatably coupled to an engine so as to be driven by the engine, the mechanical pump fluidly connected to the engine, a DEF injector, and a heat exchanger, the mechanical pump configured to pump coolant through the engine, the DEF injector, and the heat exchanger;
an electric pump fluidly connected to the DEF injector and configured to pump coolant through the DEF injector; and
an electronic controller configured to:
receive an ambient temperature signal indicative of an ambient temperature;
determine a pump run time based on the ambient temperature signal; and
power the electric pump after a shutdown of the engine for the pump run time.

2. The cooling system of claim 1, wherein the electrical pump is fluidly connected in series with the mechanical pump and the DEF injector, and the electrical pump is fluidly connected between the mechanical pump and the DEF injector downstream of the mechanical pump.

3. The cooling system of claim 2, wherein the DEF injector is fluidly connected in series with the electric pump and the mechanical pump, and the DEF injector is fluidly connected between the electric pump and the mechanical pump downstream of the electric pump.

4. The cooling system of claim 2, wherein the mechanical pump, electric pump, and DEF injector are fluidly connected in series in a loop, the mechanical pump is fluidly connected to the electric pump upstream of the electric pump, the electric pump is fluidly connected to the DEF injector upstream of the DEF injector, and the DEF injector is fluidly connected to the mechanical pump upstream of the mechanical pump.

5. The cooling system of claim 4, wherein the loop is a first loop, the mechanical pump is fluidly connected to the heat exchanger in a second loop configured to allow coolant to flow from the mechanical pump to the heat exchanger and from the heat exchanger to the mechanical pump, and the second loop is separate from the first loop.

6. The cooling system of claim 2, wherein the controller is further configured to power the electric pump for less than 50% of the time the engine is running.

7. The cooling system of claim 6, wherein the controller is further configured to power the electric pump less than 5% of the time the engine is running.

8. The cooling system of claim 2, wherein the controller is further configured to:
power the electric pump during engine operation; and
determine whether the electric pump is operational.

9. The cooling system of claim 8, wherein the controller is further configured to derate the engine if the electric pump is not operational.

10. The cooling system of claim 8, wherein the controller is further configured to prevent regeneration by the engine and an exhaust aftertreatment system if the electric pump is not operational.

11. A method of cooling a DEF injector comprising:
providing coolant flow from a mechanical pump to the DEF injector during operation of an engine, the mechanical pump rotationally coupled to the engine;
detecting a shutdown of the engine;
sensing an ambient temperature;
determining a pump run time based on the sensed ambient temperature; and
powering an electric pump to pump coolant through the DEF injector for the determined pump run time after the detected shutdown of the engine.

12. The method of claim 11, wherein coolant flow from the mechanical pump passes through the electric pump before reaching the DEF injector.

13. The method of claim 12, further comprising determining the pump run time to prevent a temperature of the DEF injector from rising above a threshold.

14. The method of claim 12, further comprising sensing a temperature of exhaust from the engine and determining the pump run time based on the sensed ambient temperature and the sensed exhaust temperature.

15. The method of claim 14, wherein the pump run time is positively correlated with the sensed ambient temperature and positively correlated with the sensed exhaust temperature.

16. The method of claim 12, further comprising powering the electric pump for less than half the time the engine is operating.

17. The method of claim 16, further comprising:
powering the electric pump to pump coolant through the DEF injector while the engine is operating; and
determining whether the electric pump is operational.

18. The method of claim 17, further comprising derating the engine during operation of the engine if the electric pump is not operational.

19. The method of claim 17, further comprising preventing regeneration by the engine and an exhaust aftertreatment system during operation of the engine if the electric pump is not operational.

20. The method of claim 17, further providing an alert if the electric pump is not operational.

* * * * *